(12) United States Patent  (10) Patent No.: US 9,072,280 B1
Ramoutar  (45) Date of Patent: Jul. 7, 2015

(54) PET FECAL MATTER COLLECTION DEVICE

(71) Applicant: Rakesh Ramoutar, Margate, FL (US)

(72) Inventor: Rakesh Ramoutar, Margate, FL (US)

( * ) Notice: Subject to any disclaimer, the term of this patent is extended or adjusted under 35 U.S.C. 154(b) by 0 days.

(21) Appl. No.: 14/317,819

(22) Filed: Jun. 27, 2014

(51) Int. Cl.
*A01K 29/00* (2006.01)
*E01H 1/12* (2006.01)
*A01K 23/00* (2006.01)

(52) U.S. Cl.
CPC .................... *A01K 23/005* (2013.01)

(58) Field of Classification Search
CPC ..................................... A01K 23/005
USPC .................... 294/1.4, 1.5, 209, 214
See application file for complete search history.

(56) References Cited

U.S. PATENT DOCUMENTS

| | | | |
|---|---|---|---|
| 3,786,780 A | 1/1974 | Pezzino | |
| 3,977,422 A | 8/1976 | Cabaluna | |
| 4,010,970 A * | 3/1977 | Campbell | 294/1.5 |
| 4,136,900 A * | 1/1979 | Thompson | 294/1.5 |
| 4,185,861 A * | 1/1980 | Berner | 294/1.5 |
| 4,335,678 A * | 6/1982 | Garza et al. | 294/1.5 |
| 4,852,924 A * | 8/1989 | Ines | 294/1.5 |
| 6,062,618 A | 5/2000 | Figueroa | |
| D461,027 S | 7/2002 | Gardner | |
| 7,090,268 B2 | 8/2006 | Borman | |
| 7,198,310 B1 | 4/2007 | Lau | |
| 7,431,361 B2 * | 10/2008 | Pilas | 294/1.5 |
| 7,686,361 B1 * | 3/2010 | Flinn | 294/1.4 |
| 8,146,967 B1 * | 4/2012 | Brown | 294/1.5 |
| 2002/0096895 A1 | 7/2002 | McCarthy | |
| 2005/0184540 A1 | 8/2005 | Graziosi | |

* cited by examiner

*Primary Examiner* — Dean Kramer

(57) ABSTRACT

A pet fecal matter collection device facilitates collection of fecal matter as a pet defecates so that a person does not have to bend down and does not come into contact with the fecal matter. The device includes an elongated shaft and a pair of pivotable bars coupled to and extending from a lower end of the shaft. A bag is provided having an open top. Each of a pair of sleeves is coupled to the bag extending along opposite sides of the open top of the bag. Each of the sleeves receives a respective one of the bars wherein pivoting of the bars opens and closes the open top of the bag. A trigger is positioned proximate an upper end of the shaft. Manipulation of the trigger pivots the bars into an open position.

7 Claims, 6 Drawing Sheets

PET FECAL MATTER COLLECTION DEVICE

BACKGROUND OF THE DISCLOSURE

Field of the Disclosure

The disclosure relates to fecal matter collection devices and more particularly pertains to a new fecal matter collection device for facilitating collection of fecal matter as a pet defecates so that a person does not have to bend down and does not come into contact with the fecal matter.

SUMMARY OF THE DISCLOSURE

An embodiment of the disclosure meets the needs presented above by generally comprising an elongated shaft and a pair of pivotable bars coupled to and extending from a lower end of the shaft. A bag is provided having an open top. Each of a pair of sleeves is coupled to the bag extending along opposite sides of the open top of the bag. Each of the sleeves receives a respective one of the bars wherein pivoting of the bars opens and closes the open top of the bag. A trigger is positioned proximate an upper end of the shaft. Manipulation of the trigger pivots the bars into an open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
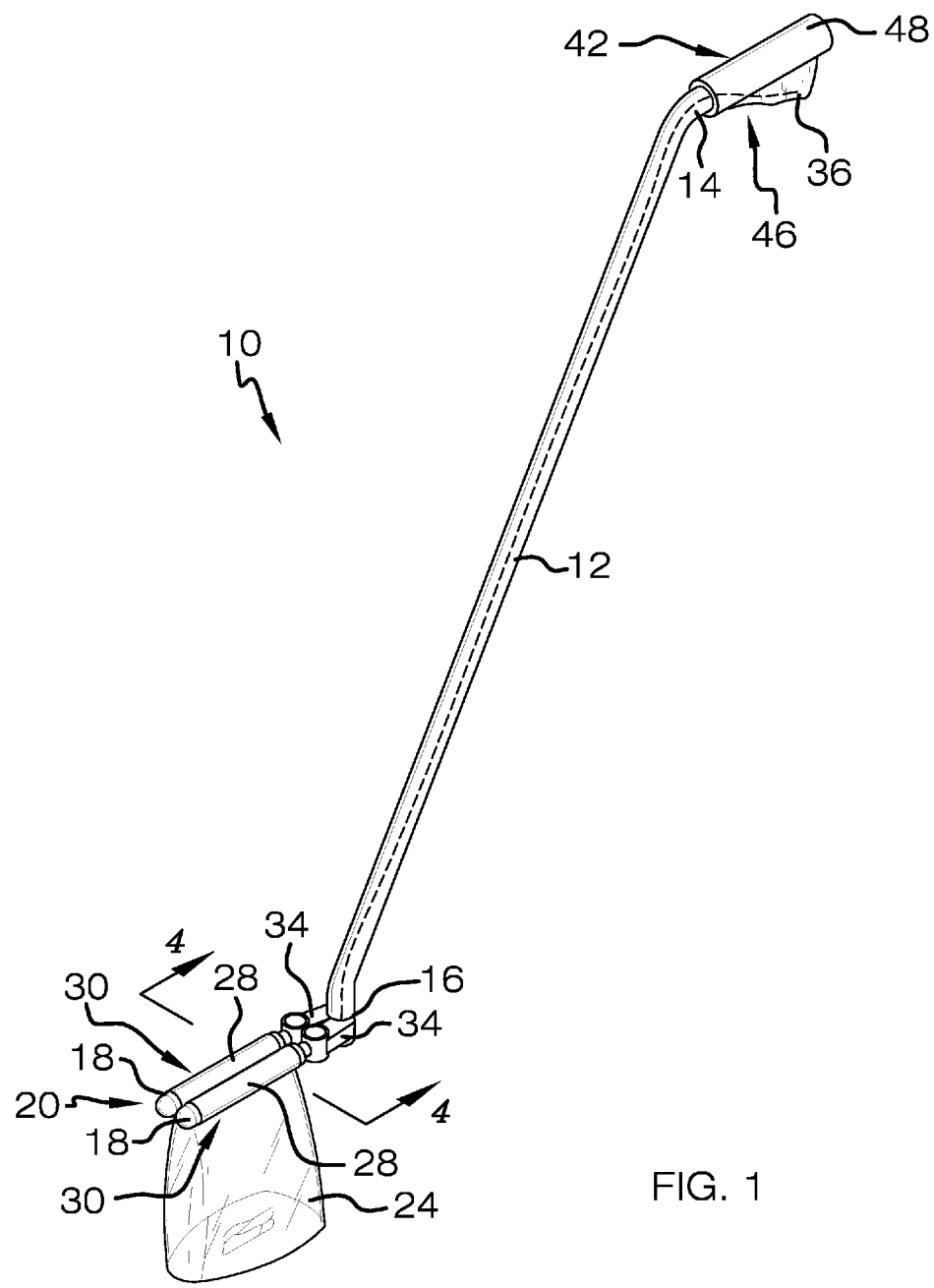
FIG. 1 is a top front side perspective view of a pet fecal matter collection device according to an embodiment of the disclosure.
Figure 2:
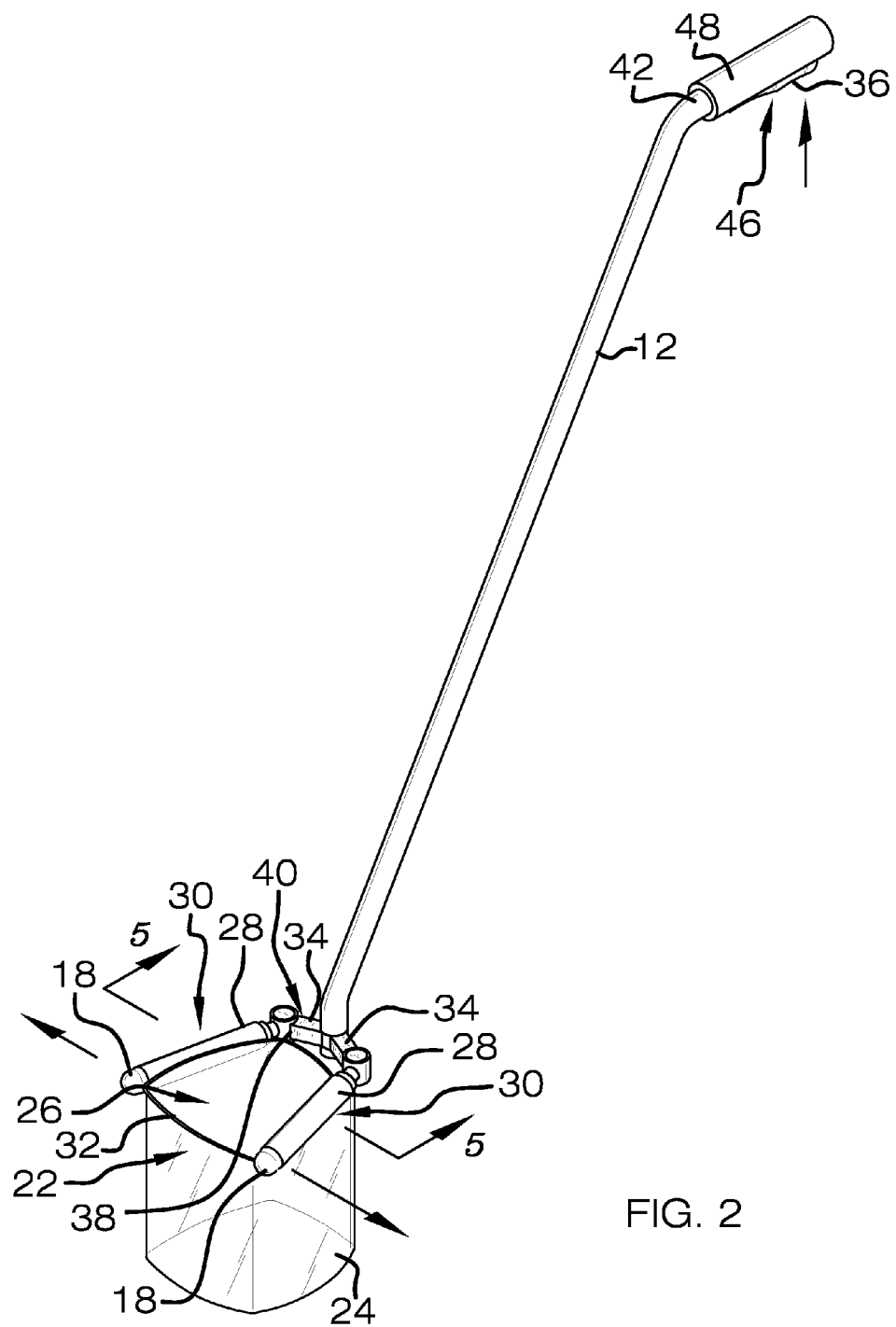
FIG. 2 is a top front side perspective view of an embodiment of the disclosure in an open position.
Figure 3:
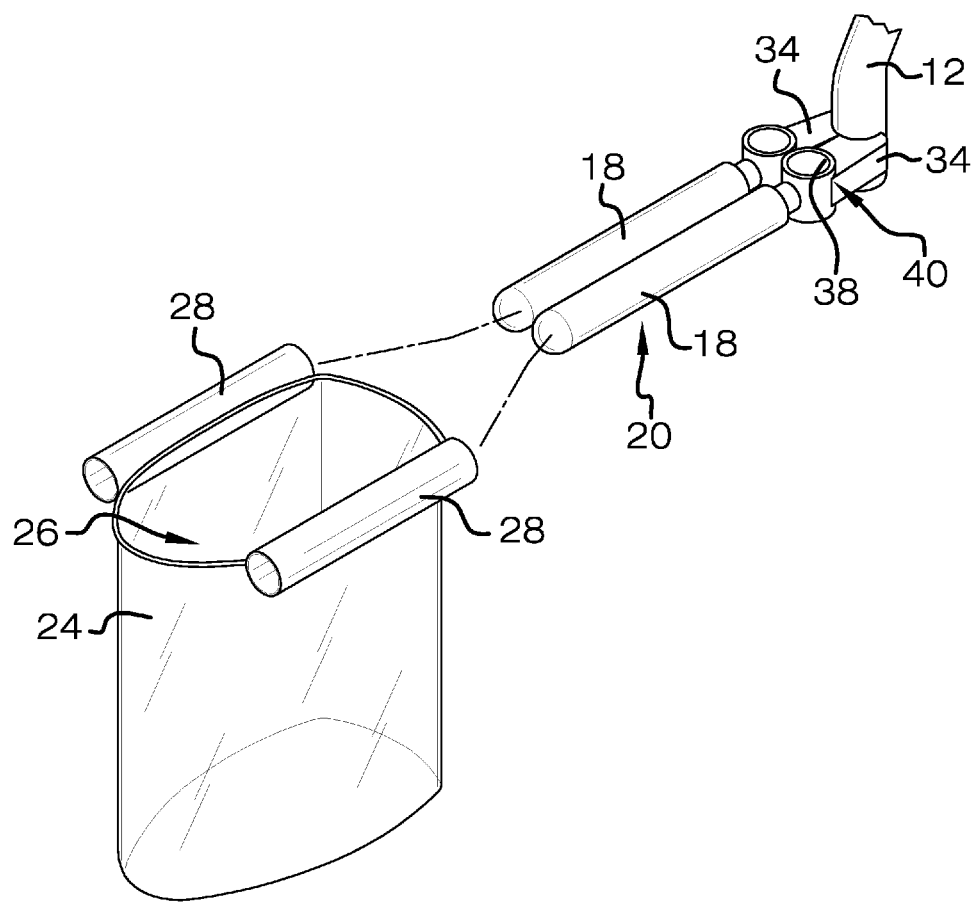
FIG. 3 is a top front side perspective view of a lower end of an embodiment of the disclosure.
Figure 4:
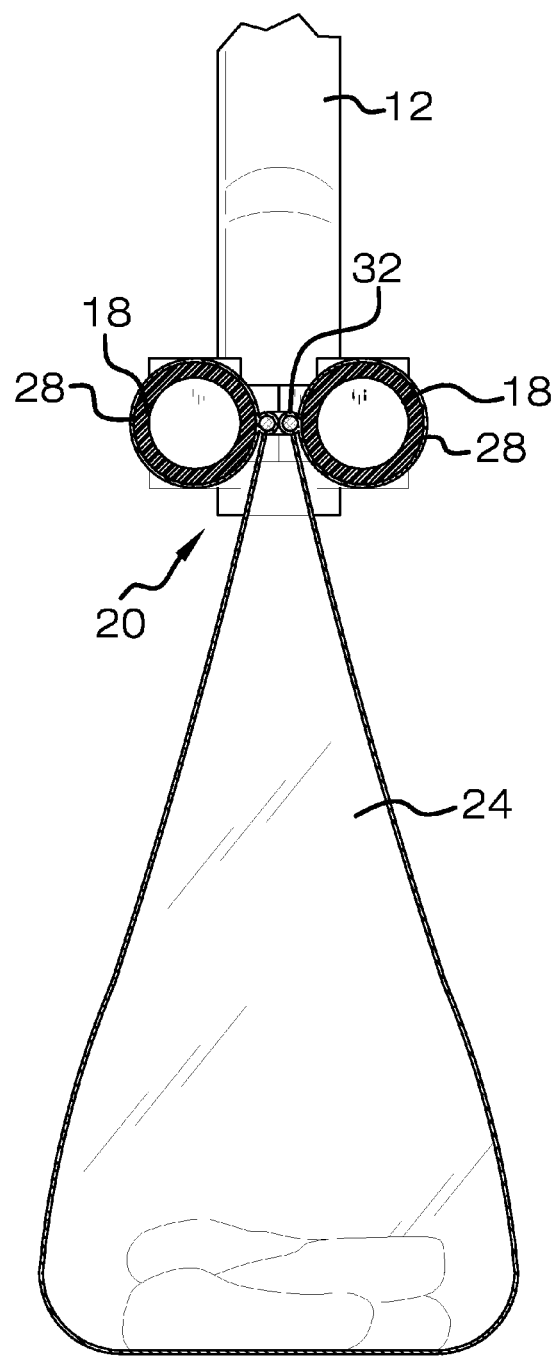
FIG. 4 is a cross-sectional view of an embodiment of the disclosure taken along line 4-4 of FIG. 1.
Figure 5:
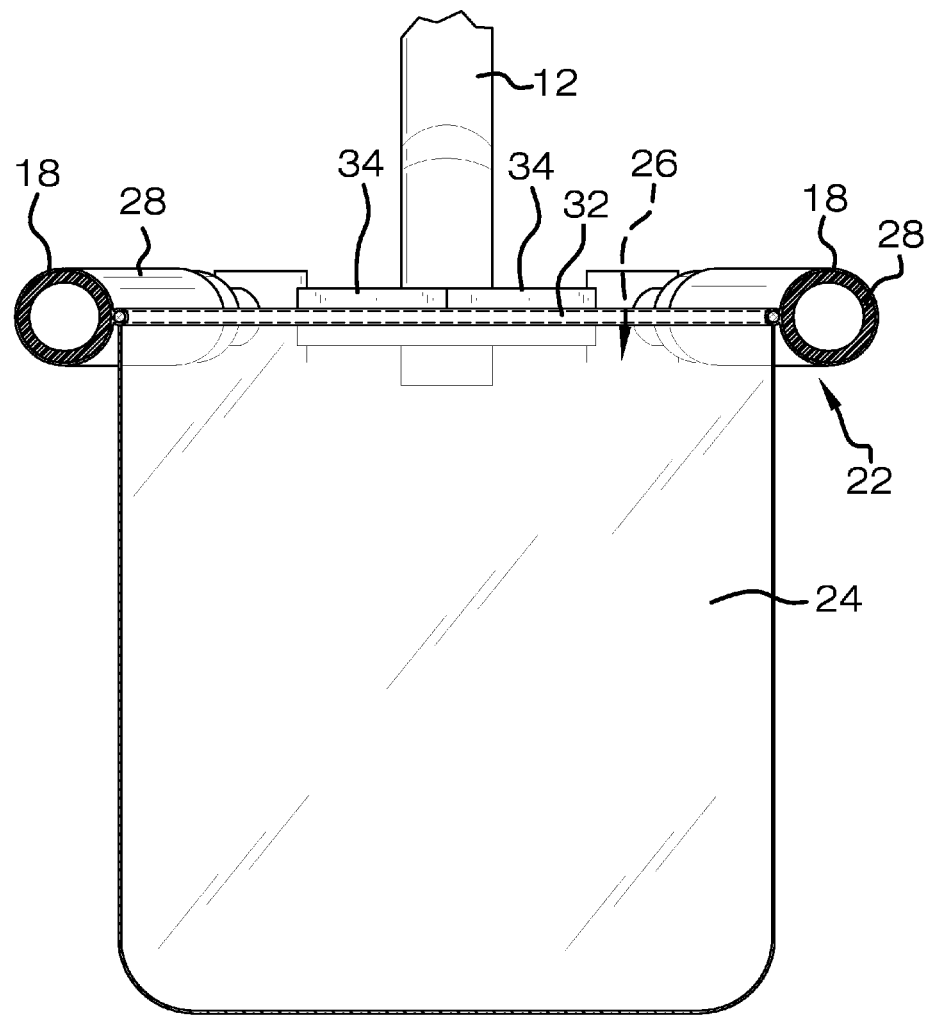
FIG. 5 is a cross-sectional view of an embodiment of the disclosure taken along line 5-5 of FIG. 2.
Figure 6:
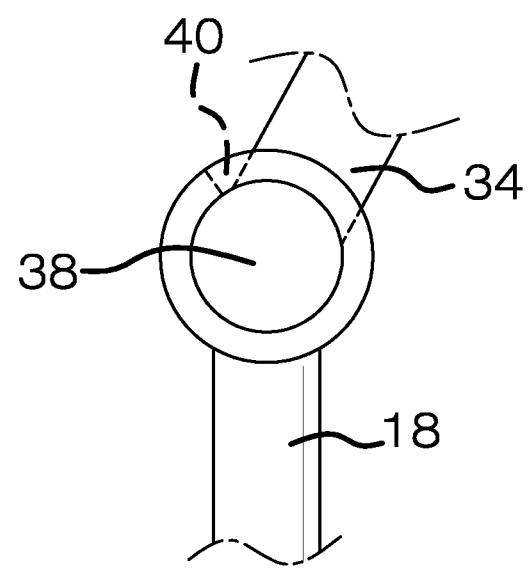
FIG. 6 is a top detailed view of an embodiment of the disclosure.

With reference now to the drawings, and in particular to FIGS. 1 through 6 thereof, a new fecal matter collection device embodying the principles and concepts of an embodiment of the disclosure and generally designated by the reference numeral 10 will be described.

As best illustrated in FIGS. 1 through 6, the pet fecal matter collection device 10 generally comprises a shaft 12 which is elongated between an upper end 14 and a lower end 16. Each of a pair of bars 18 is coupled to and extends from the lower end 16 of the shaft 12. The bars 18 are pivotable between a closed position 20 wherein the bars 18 are adjacently positioned and an open position 22 wherein the bars are spaced apart from each other. A bag 24 has an open top 26. Each of a pair of sleeves 28 is coupled to the bag 24. The sleeves 28 extend along opposite sides 30 of the open top 26 of the bag 24. Each of the sleeves 28 is positionable to extend over and receive a respective one of the bars 18 wherein pivoting of the bars 18 opens and closes the open top 26 of the bag 24. A band 32 is coupled to the bag 24. The band 32 is resilient and may be constructed of rubber, elastic, or the like. The band 32 urges the sleeves 28 together wherein the bag 24 is substantially closed until the sleeves 28 are forced apart by pivoting of the bars 18.

Each of a pair of spacers 34 is coupled between the lower end 16 of the shaft 12 and an associated one of the bars 18. Each of the spacers 34 is pivoted relative to the shaft 12 when a trigger 36 is manipulated. Each of the spacers 34 is pivotally coupled to the associated one of the bars 18. Each of the spacers 34 has a distal end 38 relative to the shaft 12 extending through a slot 40 in the associated one of the bars 18 such that the slot 40 limits pivoting of the bars 18 relative to the spacers 34 as the spacers 34 are pivoted relative to the shaft 12. Thus, the sleeves 28 are moved apart in a manner in which the sleeves 28 remain closer to parallel than with an unpivoted connection between each of the spacers 34 and the associated bar 18.

The trigger 36 is coupled to the shaft 12 and may be more particularly positioned on a handle 42 coupled to and extending from the upper end 14 of the shaft 12. Thus, the trigger 36 is positioned proximate the upper end 14 of the shaft 12 to be accessible for use without a person having to reach down on the shaft 12. The trigger 36 is operationally coupled to the bars 18 in a conventional manner such that the bars 18 are pivoted into the open position 22 by manipulation of the trigger 36. The trigger 36 may be coupled to and extend from the handle 42 along a bottom side 46 of the handle 42. A grip 48 may be coupled to and extend around the handle 42 and along a length of the handle 42 to provide cushioning, enhance grasping of the device 10, or the like.

In use, the device 10 is carried while accompanying a pet for purposes of allowing the pet to defecate. When the pet begins to defecate, the shaft 12 is manipulated to position the bag 24 and the trigger 36 is squeezed to open the bag 24 to catch fecal matter excreted from the pet. When defecation is complete, the trigger 36 is released and the sleeves 28 may be pulled from the bars 18 for disposal of the bag 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet fecal matter collection device comprising:
a shaft being elongated between an upper end and a lower end;
a pair of bars coupled to and extending from said lower end of said shaft, said bars being pivotable between a closed position wherein said bars are adjacently positioned and an open position wherein said bars are spaced;
a bag having an open top;
a pair of sleeves coupled to said bag, said sleeves extending along opposite sides of said open top of said bag, each of said sleeves being positionable to extend over a respective one of said bars wherein pivoting of said bars opens and closes said open top of said bag;
a trigger coupled to said shaft, said trigger being positioned proximate said upper end of said shaft, said trigger being operationally coupled to said bars wherein said bars are pivoted into said open position by manipulation of said trigger; and
a pair of spacers, each of said spacers being coupled between said lower end of said shaft and an associated one of said bars, each of said spacers being pivoted relative to said shaft when said trigger is manipulated, each of said spacers being pivotally coupled to said associated one of said bars, each of said spacers having a distal end relative to said shaft extending through a slot in said associated one of said bars such that said slot limits pivoting of said bars relative to said spacers as said spacers are pivoted relative to said shaft.

2. The device of claim 1, further comprising a handle, said handle being coupled to and extending from said upper end of said shaft.

3. The device of claim 2, further comprising said trigger being coupled to and extending from said handle.

4. The device of claim 3, further comprising said trigger extending along a bottom side of said handle.

5. The device of claim 2, further comprising a grip coupled to and extending around said handle.

6. The device of claim 1, further comprising a band coupled to said bag, said band being resilient, said band urging said sleeves together wherein said bag is substantially closed until said sleeves are forced apart.

7. A pet fecal matter collection device comprising:
a shaft being elongated between an upper end and a lower end;
a pair of bars coupled to and extending from said lower end of said shaft, said bars being pivotable between a closed position wherein said bars are adjacently positioned and an open position wherein said bars are spaced;
a bag having an open top;
a pair of sleeves coupled to said bag, said sleeves extending along opposite sides of said open top of said bag, each of said sleeves being positionable to extend over a respective one of said bars wherein pivoting of said bars opens and closes said open top of said bag;
a trigger coupled to said shaft, said trigger being positioned proximate said upper end of said shaft, said trigger being operationally coupled to said bars wherein said bars are pivoted into said open position by manipulation of said trigger;
a band coupled to said bag, said band being resilient, said band urging said sleeves together wherein said bag is substantially closed until said sleeves are forced apart;
a pair of spacers, each of said spacers being coupled between said lower end of said shaft and an associated one of said bars, each of said spacers being pivoted relative to said shaft when said trigger is manipulated, each of said spacers being pivotally coupled to said associated one of said bars, each of said spacers having a distal end relative to said shaft extending through a slot in said associated one of said bars such that said slot limits pivoting of said bars relative to said spacers as said spacers are pivoted relative to said shaft;
a handle, said handle being coupled to and extending from said upper end of said shaft, said trigger being coupled to and extending from said handle, said trigger extending along a bottom side of said handle; and
a grip coupled to and extending around said handle.

* * * * *